(12) United States Patent
Oouchi

(10) Patent No.: US 11,384,511 B2
(45) Date of Patent: Jul. 12, 2022

(54) WHEELED WORK VEHICLE

(71) Applicant: HITACHI CONSTRUCTION MACHINERY CO., LTD., Tokyo (JP)

(72) Inventor: Kazuhiro Oouchi, Ushiku (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 17/273,440

(22) PCT Filed: Dec. 13, 2019

(86) PCT No.: PCT/JP2019/049000
§ 371 (c)(1),
(2) Date: Mar. 4, 2021

(87) PCT Pub. No.: WO2020/202652
PCT Pub. Date: Oct. 8, 2020

(65) Prior Publication Data
US 2021/0340730 A1 Nov. 4, 2021

(30) Foreign Application Priority Data
Mar. 29, 2019 (JP) .............................. JP2019-067178

(51) Int. Cl.
*E02F 9/22* (2006.01)
*E02F 9/20* (2006.01)
*F15B 15/28* (2006.01)

(52) U.S. Cl.
CPC .......... *E02F 9/2228* (2013.01); *E02F 9/2079* (2013.01); *E02F 9/2253* (2013.01);
(Continued)

(58) Field of Classification Search
CPC .............................. E02F 9/2253; E02F 9/2079
See application file for complete search history.

(56) References Cited

U.S. PATENT DOCUMENTS 6,182,448 B1 * 2/2001 Ohkura ............... F16H 61/4148
60/494
6,938,719 B2 * 9/2005 Ishimaru ................. F16H 61/47
60/431
(Continued)

FOREIGN PATENT DOCUMENTS

DE 26 52 976 A1 5/1978
JP 08-014384 A 1/1996
(Continued)

OTHER PUBLICATIONS

International Preliminary Report on Patentability received in corresponding International Application No. PCT/JP2019/049000 dated Oct. 14, 2021.
(Continued)

*Primary Examiner* — Thomas E Lazo
(74) *Attorney, Agent, or Firm* — Mattingly & Malur, PC

(57) ABSTRACT

A wheeled work vehicle includes: a transmission transmitting the rotational power of a traveling hydraulic motor to wheels; a traveling control valve having an interruption position that interrupts supply of hydraulic fluid from a hydraulic pump to the traveling hydraulic motor; a shift changeover valve that shifts the speed stage of the transmission by the position of the shift changeover valve being selectively switched; and a controller that controls the traveling control valve and the shift changeover valve. The controller switches the traveling control valve to the interruption position, then switches the position of the shift changeover valve such that the speed stage of the transmission is shifted to the low speed stage, and switches the traveling control valve from the interruption position to an original position side before the switching in a case where the controller shifts the transmission from the high speed stage to the low speed stage.

5 Claims, 6 Drawing Sheets

(52) U.S. Cl.
CPC .......... *E02F 9/2267* (2013.01); *E02F 9/2285* (2013.01); *F15B 15/2815* (2013.01); *E02F 9/2292* (2013.01); *E02F 9/2296* (2013.01)

(56) References Cited

U.S. PATENT DOCUMENTS

| | | | |
|---|---|---|---|
| 8,322,481 B2 * | 12/2012 | Satake | B60W 10/06 180/305 |
| 2009/0238696 A1 | 9/2009 | Satake et al. | |
| 2013/0152574 A1 * | 6/2013 | Yamazaki | F16H 61/421 60/431 |

FOREIGN PATENT DOCUMENTS

| | | |
|---|---|---|
| JP | 08-082367 A | 3/1996 |
| JP | 2008-163669 A | 7/2008 |
| JP | 2012-052580 A | 3/2012 |

OTHER PUBLICATIONS

International Search Report of PCT/JP2019/049000 dated Mar. 10, 2020.
Extended European Search Report received in corresponding European Application No. 19923294.3 dated Apr. 22, 2022.

\* cited by examiner

WHEELED WORK VEHICLE

TECHNICAL FIELD

The present invention relates to a wheeled work vehicle, and more particularly to a wheeled work vehicle including a transmission.

BACKGROUND ART

Some wheeled work vehicles such as a wheeled hydraulic excavator and a wheel loader has a transmission interposed between a traveling hydraulic motor and wheels. The transmission transmits the rotational power of the traveling hydraulic motor to the wheels with a change in speed. In order to suppress a shock at shifting of the transmission, some such wheeled work vehicles decrease the tilting angle (displacement) of the variable displacement hydraulic motor driven by hydraulic fluid from a hydraulic pump to a predetermined value when the transmission is shifted from high (first speed change ratio) to low (second speed change ratio) (see Patent Document 1, for example).

PRIOR ART DOCUMENT

Patent Document

JP-2012-52580-A

SUMMARY OF THE INVENTION

Problem to Be Solved By the Invention

A traveling controller of a work vehicle described in Patent Document 1 is applied to a wheel loader. The wheel loader generally further includes a work implement hydraulic pump that supplies hydraulic fluid to a hydraulic actuator (hydraulic cylinder) that drives a front work implement in addition to a traveling hydraulic pump that supplies hydraulic fluid to a traveling hydraulic motor. In such a configuration, control of the tilting angle (displacement) of the traveling hydraulic pump and control of the tilting angle (displacement) of the work implement hydraulic pump are performed independently of each other. In addition, the tilting angle of the traveling hydraulic pump is generally controlled so as to be changed according to a change in the tilting angle of the traveling hydraulic motor.

Hence, in a case where the tilting angle of the traveling hydraulic motor is changed when the transmission is shifted from high to low as in the traveling controller of the work vehicle described in Patent Document 1, the tilting angle of the traveling hydraulic pump is also changed accordingly. The control of the tilting angle of the traveling hydraulic pump and the control of the tilting angle of the work implement hydraulic pump are individually performed independently of each other. Thus, even when the tilting angle of the traveling hydraulic pump is changed, the tilting angle of the work implement hydraulic pump is not changed. Hence, in the wheel loader as described above, operation of the front work implement is not affected even when the tilting angle of the traveling hydraulic motor is changed at the shifting of the transmission from high to low.

In a wheeled hydraulic excavator, generally, a hydraulic pump that supplies hydraulic fluid to a traveling hydraulic motor supplies the hydraulic fluid also to a work implement hydraulic actuator. In addition, also in the wheeled hydraulic excavator, as in the wheel loader, the tilting angle of the hydraulic pump is generally controlled according to a change in the tilting angle of the traveling hydraulic motor. In the wheeled hydraulic excavator of such a configuration, when the tilting angle of the traveling hydraulic motor is changed at shifting of the transmission from high to low as in the traveling controller of the work vehicle described in Patent Document 1, the tilting angle of the hydraulic pump is also changed accordingly. Since the hydraulic pump of the wheeled hydraulic excavator supplies the hydraulic fluid to not only the traveling hydraulic motor but also the work implement hydraulic actuator, the driving of the work implement hydraulic actuator may be affected by control of the tilting angle of the hydraulic pump as the tilting angle of the traveling hydraulic motor is changed.

Thus, in the wheeled work vehicle in which the common hydraulic pump serves as a hydraulic pump that supplies the hydraulic fluid to the traveling hydraulic motor and a hydraulic pump that supplies the hydraulic fluid to the work implement hydraulic actuator, a change in the tilting angle of the traveling hydraulic motor at shifting of the transmission from high to low may affect operability of the front work implement, and invite a decrease in work efficiency.

The present invention has been made to solve the above-described problems. It is an object of the present invention to provide a wheeled work vehicle that can alleviate a shock at of a transmission from a high speed stage to a low speed stage without operability of a work implement being affected.

Means for Solving the Problems

The present application includes a plurality of means for solving the above problems. To cite an example of the means, there is provided a wheeled work vehicle including: a prime mover; a hydraulic pump driven by the prime mover; a traveling hydraulic motor driven by hydraulic fluid supplied from the hydraulic pump; a wheel driven by rotational power of the traveling hydraulic motor; a transmission that is interposed between the traveling hydraulic motor and the wheel, transmits the rotational power of the traveling hydraulic motor to the wheel with a change in speed, and has at least two speed stages, the two speed stages being a first speed stage and a second speed stage as a higher speed stage than the first speed stage; a traveling control valve that controls a direction and a flow rate of the hydraulic fluid to be supplied from the hydraulic pump to the traveling hydraulic motor and has a first interruption position that interrupts supply of the hydraulic fluid from the hydraulic pump to the traveling hydraulic motor; a changeover valve that shifts a speed stage of the transmission through supply and discharge of hydraulic fluid to and from the transmission by a position of the changeover valve being selectively switched; and a controller that controls the traveling control valve and the changeover valve. The controller is configured to switch the traveling control valve to the first interruption position, then switch the position of the changeover valve such that the speed stage of the transmission is shifted from the second speed stage to the first speed stage, and switch the traveling control valve from the first interruption position to an original position side before the switching in a case where the controller shifts the speed stage of the transmission from the second speed stage to the first speed stage.

Advantage of the Invention

According to the present invention, the controller performs control so as to switch the position of the changeover valve after switching the traveling control valve to the first interruption position. Thus, the transmission can be shifted from the second speed stage as a high speed stage to the first speed stage as a low speed stage after the rotational speed of the traveling hydraulic motor is decreased by interruption of the supply of the hydraulic fluid from the hydraulic pump to the traveling hydraulic motor. In this case, the displacements of the hydraulic pump and the traveling hydraulic motor do not need to be changed at the shifting of the transmission to the low speed stage. Hence, even when the wheeled work vehicle has a work implement, a shock at the shifting of the transmission from the high speed stage to the low speed stage can be alleviated without operability of the work implement being affected.

Problems, configurations, and effects other than those described above will be made apparent by the following description of embodiments.

MODES FOR CARRYING OUT THE INVENTION

Wheeled work vehicles according to embodiments of the present invention will hereinafter be described with reference to the drawings. In the present description, wheeled hydraulic excavators will be illustrated as an example of the wheeled work vehicle to which the present invention is applied.

First Embodiment

Figure 1:
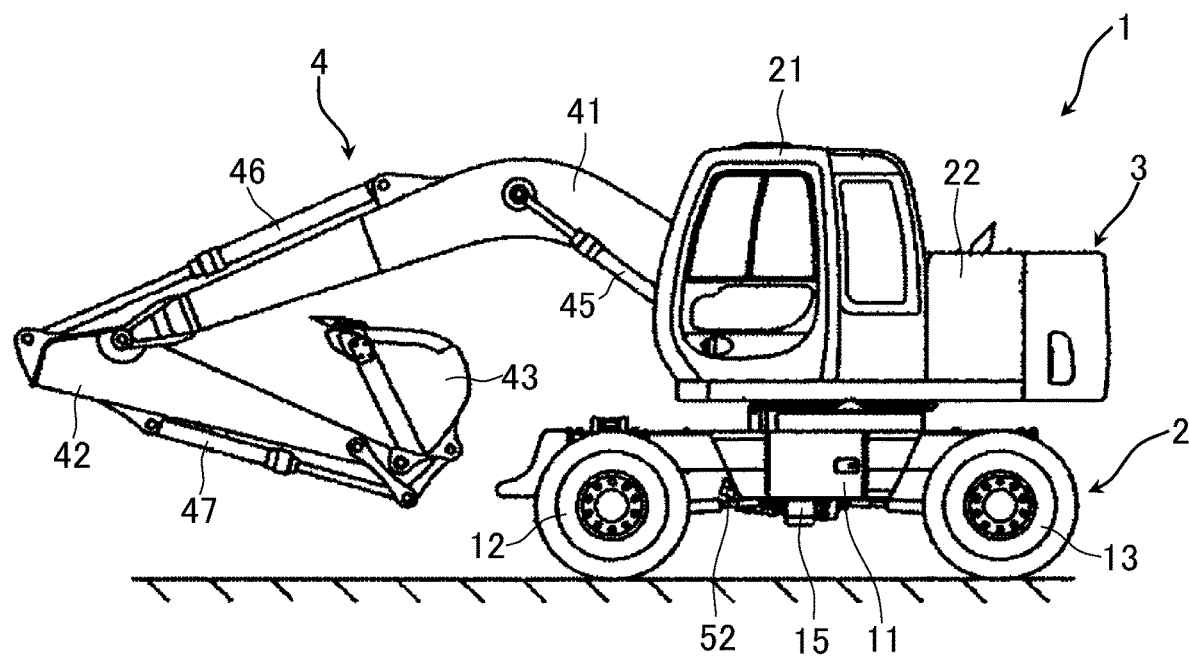
FIG. 1 is a side view illustrating a wheeled hydraulic excavator as a wheeled work vehicle according to a first embodiment of the present invention.

A configuration of a wheeled hydraulic excavator as a wheeled work vehicle according to a first embodiment of the present invention will first be described with reference to FIG. 1. FIG. 1 is a side view illustrating the wheeled hydraulic excavator as the wheeled work vehicle according to the first embodiment of the present invention. Description will be made with a left-right direction in FIG. 1 set as a front-rear direction of the wheeled hydraulic excavator.

In FIG. 1, the wheeled hydraulic excavator 1 includes a wheeled lower track structure 2 capable of being self-propelled and an upper swing structure 3 swingably mounted on the lower track structure 2. The lower track structure 2 and the upper swing structure 3 constitute a vehicle body of the wheeled hydraulic excavator 1. A front work implement 4 is elevatably provided to a front portion of the upper swing structure 3.

The lower track structure 2 includes: a chassis 11 formed by a box structure extending in the front-rear direction; a left and a right front wheel 12 (only the left side is illustrated) provided to the front side of the chassis 11; and a left and a right rear wheel 13 (only the left side is illustrated) provided to the rear side of the chassis 11. A traveling hydraulic motor 52 and a transmission 15 coupled to the traveling hydraulic motor 52 are arranged on the lower side of a central portion of the chassis 11 in the front-rear direction. An inclination angle sensor 30 (see FIG. 2) to be described later is attached to the lower track structure 2.

The upper swing structure 3 includes a cab 21 that an operator boards and a machine room 22 that houses various kinds of devices. Arranged in the cab 21 are a work implement operation device (not illustrated) for the operator to operate the front work implement 4, a traveling pedal 62a (see FIG. 2) to be described later, a forward/rearward traveling switching instruction device 25 (see FIG. 2) to be described later, a shift instruction device 26 (see FIG. 2) to be described later, and the like. The machine room 22, for example, houses a prime mover 28 and a hydraulic pump 51 (see FIG. 2 for both) to be described later or the like.

The front work implement 4 is an articulated work device for performing excavation work or the like. The front work implement 4, for example, includes a boom 41, an arm 42, and a bucket 43 as an attachment. The boom 41 is rotatably coupled to the front portion of the upper swing structure 3. The arm 42 is rotatably coupled to a distal end portion of the boom 41. The bucket 43 is rotatably coupled to a distal end portion of the arm 42. The boom 41, the arm 42, and the bucket 43 are respectively driven by a boom cylinder 45, an arm cylinder 46, and a bucket cylinder 47 as hydraulic actuators.

Figure 2:
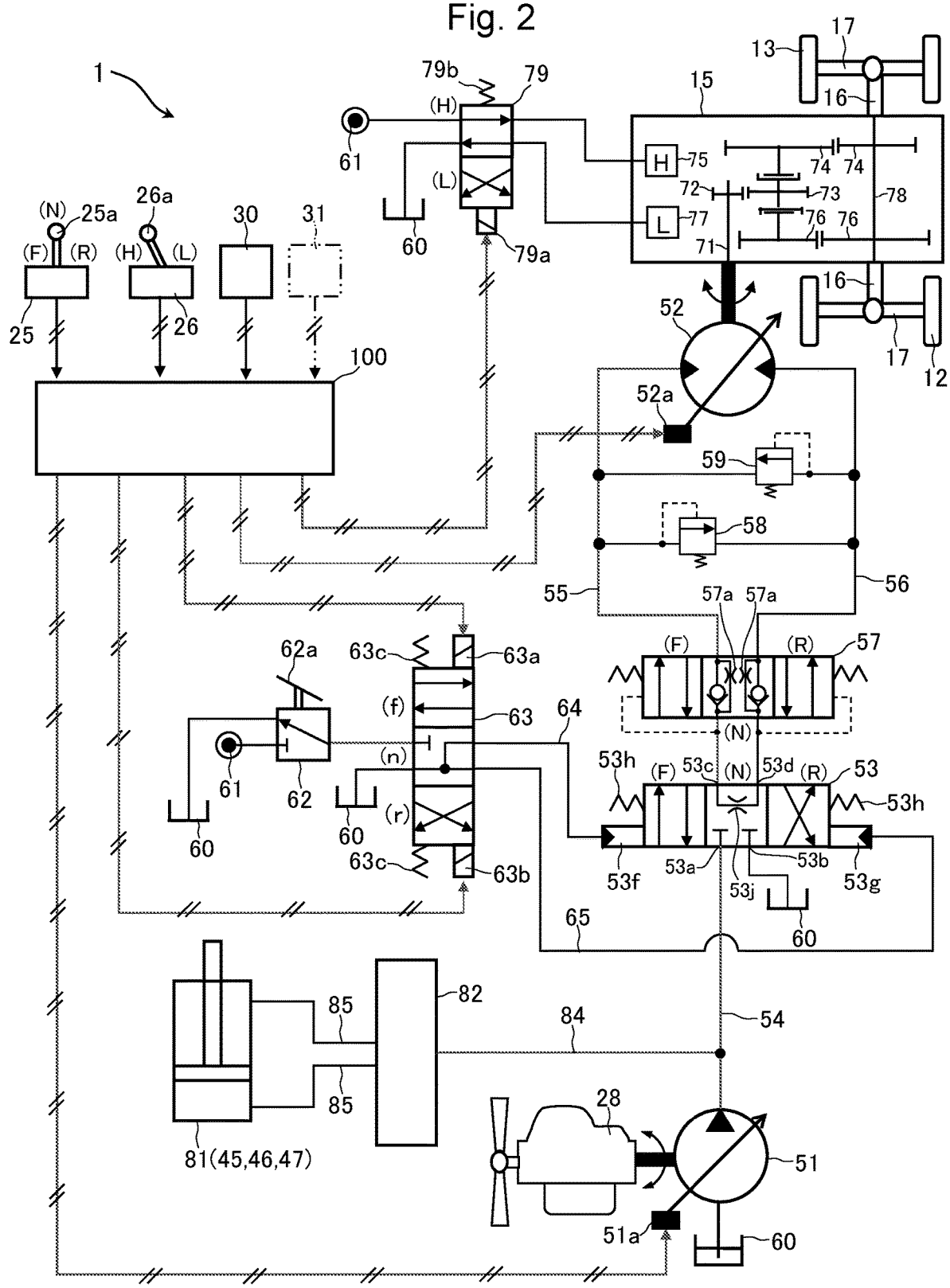
FIG. 2 is a diagram illustrating a hydraulic circuit and a traveling power transmitting mechanism in the wheeled work vehicle according to the first embodiment of the present invention.

Next, referring to FIG. 2, description will be made of a configuration of a hydraulic circuit and a traveling power transmitting mechanism in the wheeled work vehicle according to the first embodiment of the present invention. FIG. 2 is a diagram illustrating the hydraulic circuit and the traveling power transmitting mechanism in the wheeled work vehicle according to the first embodiment of the present invention.

In FIG. 2, the hydraulic circuit includes: the hydraulic pump 51 driven by the prime mover 28 such as an engine, an electric motor, or the like; the traveling hydraulic motor 52 driven by hydraulic fluid supplied from the hydraulic pump 51; and a traveling control valve 53 that controls the direction and flow rate of the hydraulic fluid supplied from the hydraulic pump 51 to the traveling hydraulic motor 52. The hydraulic pump 51 is connected to the traveling control valve 53 via a delivery line 54. The traveling hydraulic motor 52 is connected to the traveling control valve 53 via a first main line 55 and a second main line 56. A counter balance valve 57 is interposed between the traveling control valve 53 and the traveling hydraulic motor 52, and a position of the counter balance valve 57 changes according to a driving pressure (load pressure) of the traveling hydraulic motor 52 which pressure occurs within the first main line 55 or the second main line 56. A first relief valve 58 and a second relief valve 59 are provided between the first main line 55 and the second main line 56, and respectively regulate maximum pressures in the first main line 55 and the second main line 56.

The hydraulic pump 51 is, for example, a variable displacement hydraulic pump. The hydraulic pump 51 has a pump regulator 51a that adjusts a pump displacement (tilting angle of a swash plate or an inclined shaft). The pump regulator 51a receives a pump displacement control signal from a controller 100 to be described later, and adjusts the pump displacement of the hydraulic pump 51 by changing the tilting angle of the swash plate or the inclined shaft on the basis of the control signal.

The traveling hydraulic motor 52 is, for example, a variable displacement hydraulic motor. The traveling hydraulic motor 52 has a motor regulator 52a that adjusts a motor displacement (tilting angle of a swash plate or an inclined shaft). The motor regulator 52a receives a motor displacement control signal from the controller 100 to be described later, and adjusts the motor displacement of the traveling hydraulic motor 52 by changing the tilting angle of the swash plate or the inclined shaft on the basis of the control signal.

The traveling control valve 53 is, for example, a four-port three-position control valve. The traveling control valve 53 can be continuously shifted from a neutral position (interruption position) N to a forward traveling position F (left side in FIG. 2) or a backward traveling position R (right side in FIG. 2). The traveling control valve 53 has a pump port 53a supplied with the hydraulic fluid from the hydraulic pump 51 via the delivery line 54, a tank port 53b communicating with a hydraulic working fluid tank 60, and a first connection port 53c and a second connection port 53d connected to the traveling hydraulic motor 52 side. The neutral position (interruption position) N of the traveling control valve 53 is a position in which the communication of the pump port 53a with the first and second connection ports 53c and 53d is interrupted and the communication of the tank port 53b with the first and second connection ports 53c and 53d is interrupted, while the first connection port 53c and the second connection port 53d communicate with each other, so that the supply of the hydraulic fluid from the hydraulic pump 51 to the traveling hydraulic motor 52 is interrupted. In the neutral position N, a restrictor 53j is provided in a hydraulic fluid line that communicates with the first connection port 53c and the second connection port 53d. The forward traveling position F is a position in which the pump port 53a and the first connection port 53c communicate with each other and the tank port 53b and the second connection port 53d communicate with each other, and the traveling hydraulic motor 52 performs normal rotation by the hydraulic fluid from the hydraulic pump 51. The backward traveling position R is a position in which the pump port 53a and the second connection port 53d communicate with each other and the tank port 53b and the first connection port 53c communicate with each other, and the traveling hydraulic motor 52 performs reverse rotation by the hydraulic fluid from the hydraulic pump 51.

The traveling control valve 53 is, for example, a hydraulic pilot control valve that has a first pilot pressure receiving portion 53f (pressure receiving portion on the left side in FIG. 2) and a second pilot pressure receiving portion 53g (pressure receiving portion on the right side in FIG. 2) at both end portions, and is driven by supply of an operating pilot pressure. In the traveling control valve 53, the position (switching direction and stroke amount) of a spool is controlled by making the operating pilot pressure (pilot secondary pressure) from a traveling pilot hydraulic circuit act on the first pilot pressure receiving portion 53f or the second pilot pressure receiving portion 53g, and a valve opening area continuously changes according to the position (stroke amount) of the spool. In addition, the traveling control valve 53 is maintained in the neutral position N by springs 53h provided at both end portions of the traveling control valve 53 when the supply of the operating pilot pressure is interrupted.

The traveling pilot hydraulic circuit includes: a pilot hydraulic fluid source 61; a traveling pilot valve 62 that generates a pilot secondary pressure according to an operation amount (depression amount) of the traveling pedal 62a, using a delivery pressure of the pilot hydraulic fluid source 61 as a primary pressure; and a selector valve 63 that succeeds the traveling pilot valve 62, and has a forward traveling position f, a backward traveling position r, and a neutral position n selected according to the operation position of the forward/rearward traveling switching instruction device 25.

The traveling pedal 62a and the traveling pilot valve 62 constitute a traveling operation device that gives an instruction for traveling. The traveling pedal 62a and the traveling pilot valve 62 adjust the stroke amount of the traveling control valve 53 through the pilot secondary pressure (operating pilot pressure) generated according to the operation amount of the traveling pedal 62a. Consequently, the flow rate of the hydraulic fluid supplied to the traveling hydraulic motor 52 is controlled, and ultimately the traveling speed of the vehicle is adjusted.

The forward/rearward traveling switching instruction device 25 gives an instruction for a traveling direction of one of forward traveling, backward traveling, and neutral (stop) of the vehicle according to the operation position of a switching operation lever 25a. Specifically, the forward/rearward traveling switching instruction device 25 outputs a traveling direction instruction signal, which is one of a forward traveling instruction signal, a backward traveling instruction signal, and a neutral instruction signal, to the controller 100 according to three operation positions of the switching operation lever 25a, the operation positions being a forward traveling position F, a backward traveling position R, and a neutral position N.

The selector valve 63 controls the driving of the traveling control valve 53 by supplying the operating pilot pressure to the first pilot pressure receiving portion 53f and the second pilot pressure receiving portion 53g of the traveling control valve 53 or interrupting the supply of the operating pilot pressure. The selector valve 63 is connected to the first pilot pressure receiving portion 53f and the second pilot pressure receiving portion 53g of the traveling control valve 53 via a first pilot line 64 and a second pilot line 65. The selector valve 63 is, for example, a four-port three-position selector valve. The selector valve 63 can be selectively changed to the forward traveling position f corresponding to the forward traveling position F of the forward/rearward traveling switching instruction device 25, the backward traveling position r corresponding to the backward traveling position R of the forward/rearward traveling switching instruction device 25, and the neutral position n corresponding to the neutral position N of the forward/rearward traveling switching instruction device 25. The neutral position (interruption position) n of the selector valve 63 is a position that interrupts the supply of the operating pilot pressure (pilot secondary pressure) from the traveling pilot valve 62 to the traveling control valve 53. The forward traveling position f is a position that supplies the operating pilot pressure to the first pilot pressure receiving portion 53f of the traveling control valve 53. The backward traveling position r is a position that supplies the operating pilot pressure to the second pilot pressure receiving portion 53g of the traveling control valve 53.

In addition, the selector valve 63 is a solenoid selector valve having a first solenoid 63a and a second solenoid 63b at both end portions thereof. The selector valve 63 is switched to the forward traveling position f by supply of driving power from the controller 100 to be described later to the first solenoid 63a, whereas the selector valve 63 is switched to the backward traveling position r by supply of the driving power to the second solenoid 63b. In addition, the supply of the driving power from the controller 100 to be described later to the first and second solenoids 63a and 63b is stopped, and the neutral position n is maintained by springs 63c provided at both end portions.

When the traveling pedal 62a is operated by depression in a state in which the selector valve 63 is switched to the forward traveling position f or the backward traveling position r, the pilot secondary pressure corresponding to an operation amount is generated by the traveling pilot valve 62, and acts on the first or second pilot pressure receiving portion 53f or 53g of the traveling control valve 53, and the traveling control valve 53 is switched from the neutral position N to the forward traveling position F side or the backward traveling position R side according to the magnitude of the pilot secondary pressure. Consequently, the hydraulic fluid is supplied from the hydraulic pump 51 to the traveling hydraulic motor 52 via the traveling control valve 53 in a state in which the hydraulic fluid is adjusted in flow rate, and the traveling hydraulic motor 52 performs rotation driving according to the flow rate of the hydraulic fluid. In a state in which the selector valve 63 is switched to the neutral position n, on the other hand, the pilot secondary pressure does not act on the first and second pilot pressure receiving portions 53f and 53g of the traveling control valve 53, so that the traveling control valve 53 is switched to the neutral position N. Consequently, the supply of the hydraulic fluid from the hydraulic pump 51 to the traveling hydraulic motor 52 is interrupted irrespective of the operation of the traveling pedal 62a. That is, the driving force of the traveling hydraulic motor 52 ceases. the counter balance valve 57 is continuously shifted from a neutral position N to a forward traveling position F side (left side in FIG. 2) or a backward traveling position R side (right side in FIG. 2) by a pressure in the first main line 55 or the second main line 56 between the traveling control valve 53 and the traveling hydraulic motor 52 acting on the counter balance valve 57 as a pilot pressure. The counter balance valve 57 has restrictors 57a in the neutral position N. The counter balance valve 57 has a function of generating a back pressure (brake pressure) in the first main line 55 or the second main line 56 as a delivery side of the traveling hydraulic motor 52 in an operation state such that the traveling hydraulic motor 52 performs a pump action.

Specifically, the counter balance valve 57 is switched from the neutral position N to the forward traveling position F side or the backward traveling position R side when the driving pressure of the traveling hydraulic motor 52 increases, the driving pressure occurring within the first main line 55 or the second main line 56 between the traveling control valve 53 and the traveling hydraulic motor 52, and is switched to the neutral position N side when the driving pressure decreases. In a state in which the counter balance valve 57 is switched to the neutral position N, the restrictor 57a of the counter balance valve 57 for a return oil from the traveling hydraulic motor 52 generates a braking pressure (brake pressure) opposing the rotation of the traveling hydraulic motor 52 in the first main line 55 or the second main line 56 between the counter balance valve 57 and the traveling hydraulic motor 52. A maximum pressure of the braking pressure on the traveling hydraulic motor 52 is limited by the first and second relief valves 58 and 59. The return oil passed through the first and second relief valves 58 and 59 is introduced to the suction side of the traveling hydraulic motor 52.

The rotational power of the traveling hydraulic motor 52 is transmitted to the front wheel 12 and the rear wheel 13 via a power transmitting mechanism. Specifically, an input shaft 71 of the transmission 15 is coupled to an output shaft of the traveling hydraulic motor 52. An output shaft 78 of the transmission 15 is coupled to a front and a rear propeller shaft 16. The rotational power transmitted from the traveling hydraulic motor 52 to the front and rear propeller shafts 16 via the transmission 15 is transmitted to the front wheel 12 and the rear wheel 13 via a front and a rear wheel axle (axle) 17, respectively.

The transmission 15 is interposed between the traveling hydraulic motor 52 and the front wheel 12 and the rear wheel 13 (wheels). The transmission 15 transmits the rotational power of the traveling hydraulic motor 52 to the front wheel 12 and the rear wheel 13 with a change in speed. The transmission 15 can be shifted by supply and discharge of the hydraulic fluid to two speed stages, that is, a low speed stage (first speed stage) and a high speed stage (second speed stage as a higher speed stage than the first speed stage) according to the operation position of a shift operation lever 26a of the shift instruction device 26 to be described later.

The transmission 15, for example, includes: an input gear 72 fixed to the input shaft 71; a reduction gear 73 that reduces the speed of rotation of the input gear 72; a high speed side clutch mechanism 75 that connects the rotation of the reduction gear 73 to a high speed side gear train 74; and a low speed side clutch mechanism 77 that connects the rotation of the reduction gear 73 to a low speed side gear train 76. Clutches of the high speed side clutch mechanism 75 and the low speed side clutch mechanism 77 are connected by being pressed through supply of a pilot pressure from the pilot hydraulic fluid source 61, whereas the connection of the clutches is released (disconnected) by removing pressing force through interruption of the supply of the pilot pressure. This transmission 15 is, for example, configured to switch the clutches of the high speed side clutch mechanism 75 and the low speed side clutch mechanism 77 to only a complete connected state and a complete disconnected state. However, a clutch connection can be performed at a low speed in order to alleviate a shock at a time of clutch connection. For example, the moving speed of the clutches can be decreased by providing a restrictor on a pilot line for making the pilot pressure act on the high speed side clutch mechanism 75 and the low speed side clutch mechanism 77.

The shift instruction device 26 gives an instruction for shifting the speed stage of the transmission 15 to either the low speed stage or the high speed stage according to the operation position of the shift operation lever 26a. Specifically, the shift instruction device 26 outputs a shift instruction signal, which is either a high speed stage instruction signal for giving an instruction for shifting the speed stage of the transmission 15 to the high speed stage or a low speed stage instruction signal for giving an instruction for shifting the speed stage of the transmission 15 to the low speed stage, to the controller 100 according to two operation positions of the shift operation lever 26a, the two operation positions being a high speed stage position H or a low speed stage position L.

A shift changeover valve 79 is used to shift the speed stage of the transmission 15. The shift changeover valve 79 selectively switches a position thereof, and thereby shifts the speed stage of the transmission 15 through supply and discharge of the hydraulic fluid to and from the high speed side clutch mechanism 75 and the low speed side clutch mechanism 77 of the transmission 15.

The shift changeover valve 79 is, for example, a four-port two-position changeover valve. The shift changeover valve 79 can be selectively switched to a high speed stage position H corresponding to the operation position of the high speed stage position H of the shift instruction device 26 or a low speed stage position L corresponding to the operation position of the low speed stage position L of the shift instruction device 26. The shift changeover valve 79 is a solenoid changeover valve having a solenoid 79a at one end portion and having a spring 79b at the other end portion. The shift changeover valve 79 is maintained in the high speed stage position H by the spring 79b, whereas the shift changeover valve 79 is switched to the low speed stage position L by supply of driving power from the controller 100 to be described later to the solenoid 79a.

In the high speed stage position H of the shift changeover valve 79, a pilot hydraulic fluid from the pilot hydraulic fluid source 61 is supplied to the high speed side clutch mechanism 75, while a pilot hydraulic fluid from the low speed side clutch mechanism 77 is discharged into the hydraulic working fluid tank 60. In the low speed stage position L, the pilot hydraulic fluid from the pilot hydraulic fluid source 61 is supplied to the low speed side clutch mechanism 77, while a pilot hydraulic fluid is discharged from the high speed side clutch mechanism 75 into the hydraulic working fluid tank 60. When the shift changeover valve 79 is switched to the high speed stage position H, the reduction gear 73 and the high speed side gear train 74 are connected to each other by the high speed side clutch mechanism 75, while connection between the reduction gear 73 and the low speed side gear train 76 by the low speed side clutch mechanism 77 is disconnected. When the shift changeover valve 79 is switched to the low speed side position, on the other hand, the reduction gear 73 and the low speed side gear train 76 are connected to each other by the low speed side clutch mechanism 77, while the connection between the reduction gear 73 and the high speed side gear train 74 by the high speed side clutch mechanism 75 is disconnected.

The hydraulic circuit further includes: a work implement hydraulic actuator 81 driven by the hydraulic fluid supplied from the hydraulic pump 51; and a work implement control valve 82 that controls the direction and flow rate of the hydraulic fluid supplied from the hydraulic pump 51 to the work implement hydraulic actuator 81. The wheeled hydraulic excavator 1 (see FIG. 1) has a plurality of work implement hydraulic actuators and a plurality of control valves corresponding to the work implement hydraulic actuators. However, FIG. 2 illustrates only one work implement hydraulic actuator and only one control valve corresponding to the one work implement hydraulic actuator. The work implement hydraulic actuator 81 is, for example, the boom cylinder 45, the arm cylinder 46, the bucket cylinder 47, or the like that drives the front work implement 4. The work implement control valve 82 is, for example, a three-position control valve, and can be continuously shifted. The work implement control valve 82 is connected to the hydraulic pump 51 via the delivery line 54 and a branch line 84 branching from the delivery line 54. The work implement control valve 82 is connected to the work implement hydraulic actuator 81 via a pair of main lines 85.

The controller 100 is electrically connected to the forward/rearward traveling switching instruction device 25, and receives a traveling direction instruction signal, which is either a forward traveling instruction signal, a backward traveling instruction signal, or a neutral instruction signal, from the forward/rearward traveling switching instruction device 25 according to the operation position of the switching operation lever 25a. In addition, the controller 100 is electrically connected to the shift instruction device 26, and receives a shift instruction signal, which is either a high speed stage instruction signal or a low speed stage instruction signal, from the shift instruction device 26 according to the operation position of the shift operation lever 26a. In addition, the inclination angle sensor 30 is electrically connected to the controller 100. The inclination angle sensor 30 detects an inclination angle of the vehicle body of the wheeled work vehicle 1 with respect to a horizontal plane in a traveling direction. The inclination angle sensor 30 outputs a detection signal (detected value) to the controller 100.

The controller 100 is electrically connected to the first and second solenoids 63a and 63b of the selector valve 63, and indirectly controls the position of the traveling control valve 53 via the selector valve 63 by directly controlling the position of the selector valve 63. Specifically, the controller 100 outputs, to the selector valve 63, a traveling valve control signal that controls the selector valve 63 to a position that is either the forward traveling position f, the backward traveling position r, or the neutral position n. In the present configuration, the output of the traveling valve control signal to the selector valve 63 by the controller 100 means the output of the driving power to the first solenoid 63a in a case of switching the selector valve 63 to the forward traveling position f, the output of the driving power to the second solenoid 63b in a case of switching the selector valve 63 to the backward traveling position r, and the stopping of the output of the driving power to the first solenoid 63a and the second solenoid 63b in a case of switching the selector valve 63 to the neutral position n.

The controller 100 is electrically connected to the solenoid 79a of the shift changeover valve 79, and controls the position of the shift changeover valve 79. Specifically, the controller 100 outputs, to the shift changeover valve 79, a shift valve control signal that controls the shift changeover valve 79 to a position that is either the high speed stage position H or the low speed stage position L. In the present configuration, the output of the shift valve control signal to the shift changeover valve 79 by the controller 100 means the output of the driving power to the solenoid 79a in a case of switching the shift changeover valve 79 to the low speed stage position L and the stopping of the output of the driving power to the solenoid 79a in a case of switching the shift changeover valve 79 to the high speed stage position H.

The controller 100 is electrically connected to the motor regulator 52a of the traveling hydraulic motor 52, and outputs, to the motor regulator 52a, a motor displacement control signal that adjusts the motor displacement (tilting angle) on the basis of the detected values of various kinds of sensors or the like. In addition, the controller 100 is electrically connected to the pump regulator 51a of the hydraulic pump 51, and outputs, to the pump regulator 51a, a pump displacement control signal that adjusts the pump displacement (tilting angle) on the basis of the operation amount of the work implement operation device, the detected values of the various kinds of sensors, the motor displacement of the traveling hydraulic motor 52, and the like. The controller 100 can, for example, adjust the motor displacement of the hydraulic pump 51 in such a manner as to be interlocked with an increase or decrease in the motor displacement of the traveling hydraulic motor 52.

Figure 3:
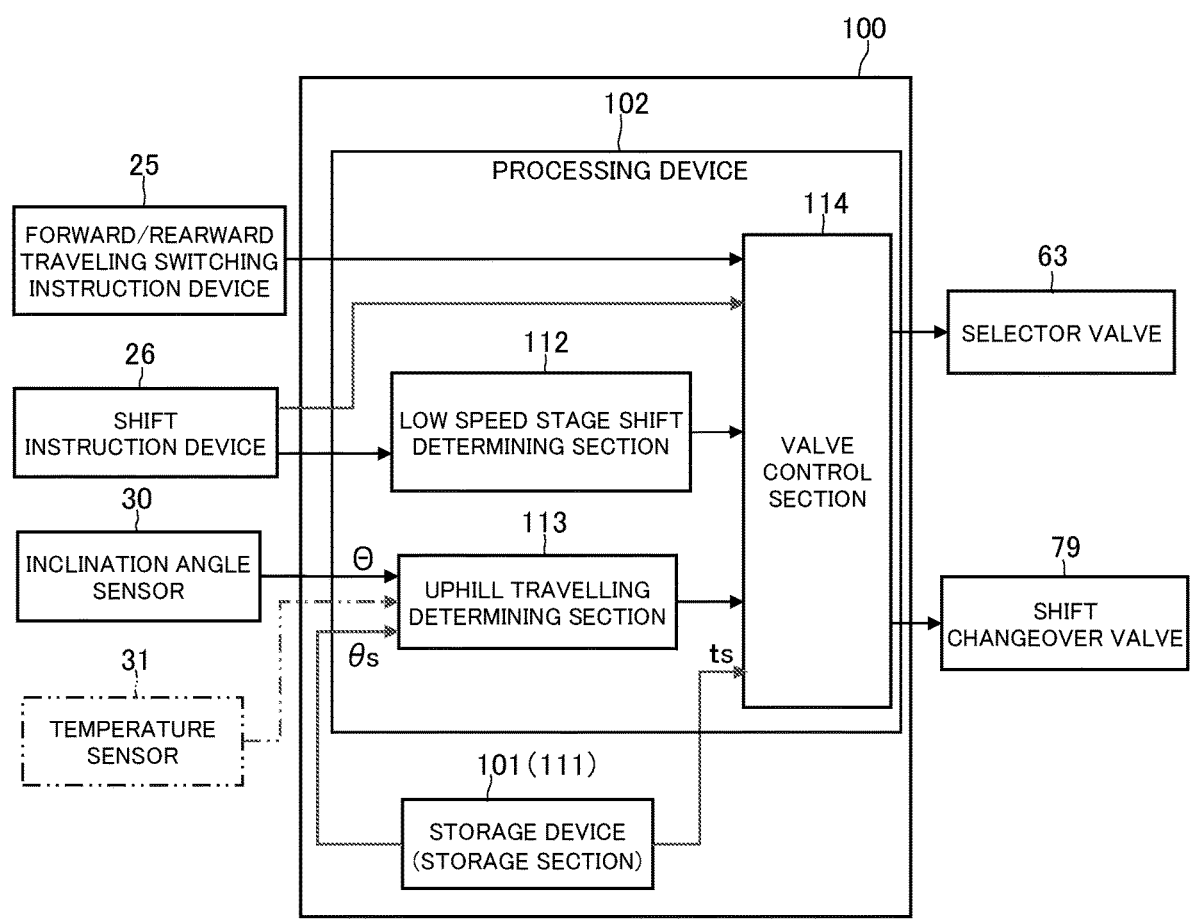
FIG. 3 is a functional block diagram of a controller that constitutes a part of the wheeled work vehicle according to the first embodiment of the present invention illustrated in FIG. 2.

Next, referring to FIG. 3, description will be made of the controller constituting a part of the wheeled work vehicle according to the first embodiment of the present invention. FIG. 3 is a functional block diagram of the controller constituting a part of the wheeled work vehicle according to the first embodiment of the present invention illustrated in FIG. 2.

The controller 100, for example, includes a storage device 101 including a RAM, a ROM, and the like and a processing device 102 including a CPU. The storage device 101 stores, in advance, a program and various kinds of information necessary for calculation of the processing device 102. The storage device 101 can also include a magnetic storage device such as a hard disk drive or the like in place of or in addition to the semiconductor memories of the ROM and the RAM. The processing device 102 implements various kinds of functions including the following functions by reading the program and the various kinds of information from the storage device 101 as appropriate, and performing processing according to the program.

The controller 100 has functions as a storage section 111, a low speed stage shift determining section 112, an uphill traveling determining section 113, and a valve control section 114.

The storage section 111 stores a set inclination angle θs determined in advance. The set inclination angle θs is a comparison target for a detected value (detected inclination angle) θ input from the inclination angle sensor 30, and is a value used to determine the presence or absence of uphill traveling of the wheeled work vehicle 1. In addition, the storage section 111 stores set times ts and Δt determined in advance. The set time ts is a comparison target for an elapsed time T to be described later that is measured by the valve control section 114, and is a value used for control to be described later on the selector valve 63 by the valve control section 114. The set time ts is set to be longer than a predetermined time taken for the high speed side clutch mechanism 75 and the low speed side clutch mechanism 77 to make a transition from a disconnected state to a completely connected state due to the switching of the position of the shift changeover valve 79. Δt is a value to be subtracted from the set time ts, and is to set the comparison target (threshold value) for the elapsed time T of the valve control section 114 to a time shorter than the set time ts during the uphill traveling of the wheeled work vehicle 1.

The low speed stage shift determining section 112 determines the presence or absence of an instruction for a downshift that shifts the speed stage of the transmission 15 from the high speed stage to the low speed stage on the basis of the shift instruction signal output from the shift instruction device 26. Specifically, whether or not the shift instruction signal from the shift instruction device 26 is shifted from the high speed stage instruction signal to the low speed stage instruction signal is determined. When the shift instruction signal is shifted from the high speed stage instruction signal to the low speed stage instruction signal, it is determined that there is an instruction for a downshift, and the determination is output to the valve control section 114. When the shifting from the high speed stage instruction signal to the low speed stage instruction signal is not performed, on the other hand, it is determined that there is no instruction for a downshift, and the determination is output to the valve control section 114.

The uphill traveling determining section 113 determines whether or not the wheeled work vehicle 1 is traveling uphill on the basis of the detected value (detected inclination angle) θ input from the inclination angle sensor 30. Specifically, whether or not the work vehicle is traveling uphill is determined by comparing the detected value θ from the inclination angle sensor 30 with the set inclination angle θs stored in the storage section 111 in advance. When the detected value θ from the inclination angle sensor 30 is larger than the set inclination angle θs, it is determined that the work vehicle is traveling uphill, and the determination is output to the valve control section 114. When the detected value θ from the inclination angle sensor 30 is equal to or smaller than the set inclination angle θs, on the other hand, it is determined that the work vehicle is not traveling uphill, and the determination is output to the valve control section 114.

The valve control section 114 outputs the traveling valve control signal that controls the position of the selector valve 63 to the selector valve 63 on the basis of the traveling direction instruction signal of the forward/rearward traveling switching instruction device 25, the determination of the low speed stage shift determining section 112, and the determination of the uphill traveling determining section 113. In addition, the valve control section 114 outputs the shift valve control signal that controls the position of the shift changeover valve 79 to the shift changeover valve 79 on the basis of the shift instruction signal of the shift instruction device 26, the determination of the low speed stage shift determining section 112, and the determination of the uphill traveling determining section 113.

Specifically, when the low speed stage shift determining section 112 determines that there is no instruction for a downshift, the valve control section 114 outputs the traveling valve control signal that controls the selector valve 63 to a position that is either the forward traveling position f, the backward traveling position r, or the neutral position n to the selector valve 63 on the basis of the traveling direction instruction signal from the forward/rearward traveling switching instruction device 25. In addition, the valve control section 114 outputs, to the shift changeover valve 79, the shift valve control signal that controls the shift changeover valve 79 to a position that is either the high speed stage position H or the low speed stage position L on the basis of the shift instruction signal from the shift instruction device 26.

When the low speed stage shift determining section 112 determines that there is an instruction for a downshift, on the other hand, the valve control section 114 outputs, to the selector valve 63, the traveling valve control signal that switches the selector valve 63 to the neutral position n irrespective of the traveling direction instruction signal from the forward/rearward traveling switching instruction device 25, and thereafter outputs, to the shift changeover valve 79, the shift valve control signal that switches the shift changeover valve 79 to the low speed stage position L. Next, the valve control section 114 measures the elapsed time T from the output of the shift valve control signal, and outputs, to the selector valve 63, the traveling valve control signal that switches the selector valve 63 from the neutral position n to the forward traveling position f or the backward traveling position r as an original position before the switching after the elapsed time T exceeds a threshold value to be described later.

In the present embodiment, the valve control section 114 changes the threshold value to be compared with the elapsed time T on the basis of the determination of the uphill traveling determining section 113. Specifically, when the uphill traveling determining section 113 determines that the wheeled work vehicle 1 is not traveling uphill, the set time ts stored in advance in the storage section 111 is used as the threshold value. When the uphill traveling determining section 113 determines that the wheeled work vehicle 1 is traveling uphill, on the other hand, ts−Δt, which is obtained by subtracting Δt stored in advance in the storage section 111 from the set time ts, is used as the threshold value. Incidentally, Δt may be adjusted according to the magnitude of the detected value of the inclination angle sensor 30.

Figure 4:
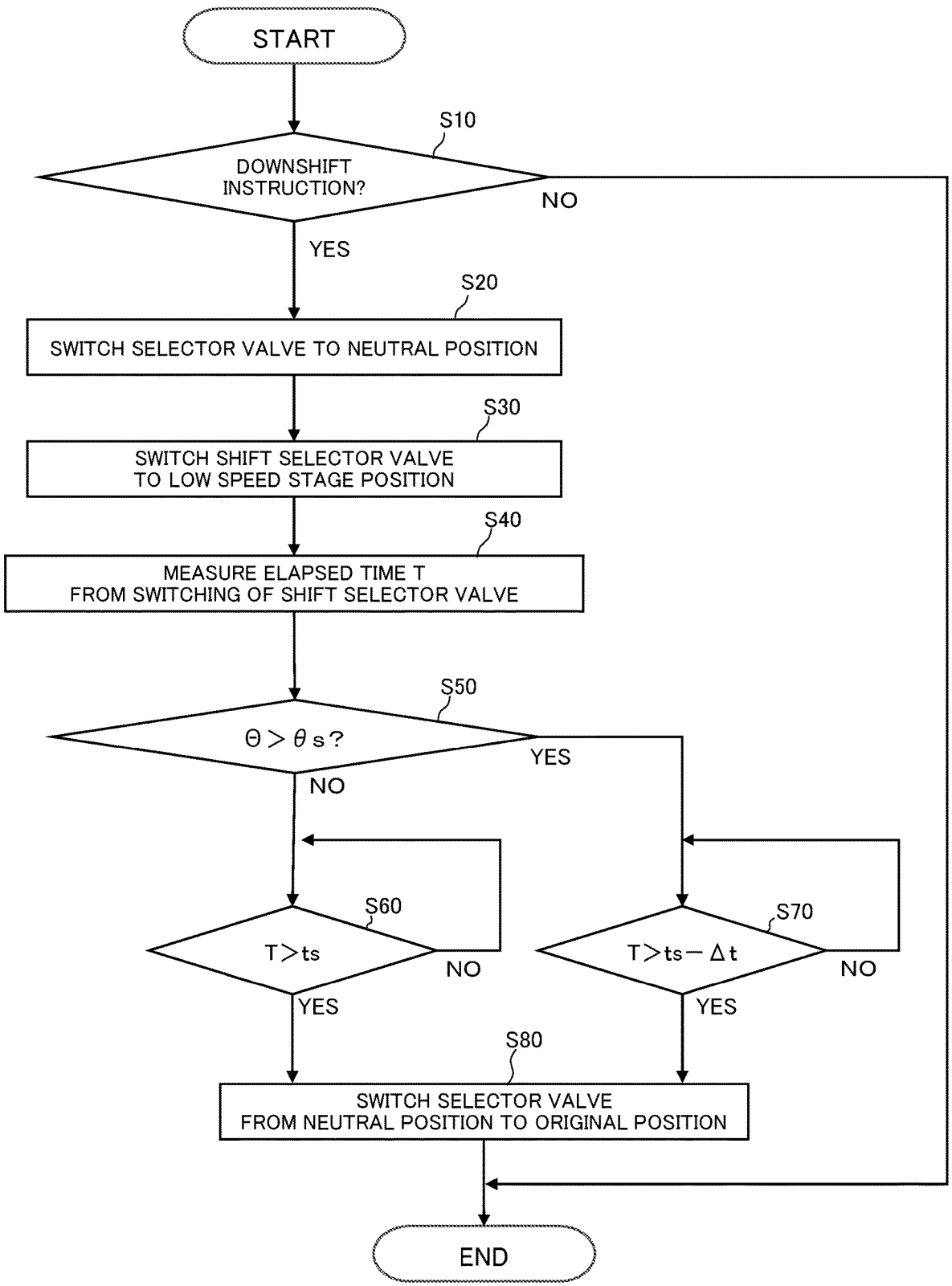
FIG. 4 is a flowchart illustrating an example of a processing procedure at shifting of a transmission from a high speed stage to a low speed stage in the controller that constitutes a part of the wheeled work vehicle according to the first embodiment of the present invention, the controller being illustrated in FIG. 3.

Next, referring to FIG. 3 and FIG. 4, description will be made of an example of a processing procedure at a downshift of the transmission in the controller constituting a part of the wheeled work vehicle according to the first embodiment of the present invention. FIG. 4 is a flowchart illustrating an example of a processing procedure at switching from the high speed stage to the low speed stage of the transmission in the controller constituting a part of the wheeled work vehicle according to the first embodiment of the present invention illustrated in FIG. 3.

In the controller 100 illustrated in FIG. 3, the low speed stage shift determining section 112 determines the presence or absence of an instruction for a downshift of the transmission 15 (see FIG. 2) on the basis of the shift instruction signal from the shift instruction device 26 (step S10 illustrated in FIG. 4). Specifically, when the shift instruction signal of the shift instruction device 26 is shifted from the high speed stage instruction signal to the low speed stage instruction signal, it is determined that there is an instruction for a downshift (YES). On the other hand, when the shift instruction signal of the shift instruction device 26 is maintained as the high speed stage instruction signal, is maintained as the low speed stage instruction signal, or is shifted from the low speed stage instruction signal to the high speed stage instruction signal, it is determined that there is no instruction for a downshift (NO). When it is determined that there is an instruction for a downshift (YES), the processing proceeds to step S20. When it is determined that there is no instruction for a downshift (NO), on the other hand, the processing procedure at the downshift is ended.

When the determination of YES is made in step S10, the valve control section 114 of the controller 100 outputs, to the selector valve 63, the traveling valve control signal that switches the selector valve 63 to the neutral position n (see FIG. 2) (step S20 illustrated in FIG. 4). When an instruction for a downshift is given, the wheeled work vehicle 1 (see FIG. 2) is usually traveling in a forward traveling direction or a backward traveling direction. That is, the forward/rearward traveling switching instruction device 25 is outputting the traveling direction instruction signal as either the forward traveling instruction signal or the backward traveling instruction signal to the controller 100. On the basis of the traveling direction instruction signal, the valve control section 114 is outputting, to the selector valve 63, the traveling valve control signal that controls the selector valve 63 to either the forward traveling position f or the backward traveling position r. When it is determined that there is an instruction for a downshift in this state, the valve control section 114 switches the selector valve 63 from the forward traveling position f or the backward traveling position r to the neutral position n irrespective of the traveling direction instruction signal of the forward/rearward traveling switching instruction device 25 before downshifting the transmission 15. Consequently, the supply of the operating pilot pressure to the first pilot pressure receiving portion 53f and the second pilot pressure receiving portion 53g of the traveling control valve 53 (see FIG. 2) is temporarily interrupted, and the traveling control valve 53 is switched to the neutral position N. As a result, traveling power disappears.

Next, the valve control section 114 outputs, to the shift changeover valve 79, the shift valve control signal that switches the shift changeover valve 79 to the low speed stage position L (step S30 illustrated in FIG. 4). Consequently, the shift changeover valve 79 is switched from the high speed stage position H to the low speed stage position L (see FIG. 2), and the connection of the high speed side clutch mechanism 75 (see FIG. 2) is disconnected, while the low speed side clutch mechanism 77 (see FIG. 2) is connected. However, it takes a predetermined time to complete mechanical disconnection of the high speed side clutch mechanism 75 and complete mechanical connection of the low speed side clutch mechanism 77 after starting interruption of supply of the pilot hydraulic fluid to the high speed side clutch mechanism 75 and supply of the pilot hydraulic fluid to the low speed side clutch mechanism 77 by switching the shift changeover valve 79 to the low speed stage position L.

Next, the valve control section 114 measures an elapsed time T from the output of the shift valve control signal to the shift changeover valve 79 (step S40 illustrated in FIG. 4). This is to return the selector valve 63 switched to the neutral position n to the original position (the forward traveling position f or the backward traveling position r) after the completion of the mechanical disconnection of the high speed side clutch mechanism 75 and the completion of the mechanical connection of the low speed side clutch mechanism 77.

Then, the uphill traveling determining section 113 of the controller 100 determines whether or not the wheeled work vehicle is traveling uphill on the basis of the detected value θ from the inclination angle sensor 30 (step S50 illustrated in FIG. 4). Specifically, it is determined that the wheeled work vehicle is not traveling uphill (NO) when the detected value θ from the inclination angle sensor 30 is equal to or smaller than the set inclination angle θs stored in the storage section 111 in advance. When the detected value θ from the inclination angle sensor 30 is larger than the set inclination angle θs, on the other hand, it is determined that the wheeled work vehicle is traveling uphill (YES). When it is determined that the wheeled work vehicle 1 is not traveling uphill (NO), the processing proceeds to step S60. When it is determined that the wheeled work vehicle 1 is traveling uphill (YES), on the other hand, the processing proceeds to step S70.

When a determination of NO is made in step S50, the valve control section 114 determines whether or not the elapsed time T measured by the valve control section 114 exceeds a threshold value (step S60 illustrated in FIG. 4). When the wheeled work vehicle 1 is not traveling uphill, the set time ts stored in the storage section 111 in advance is used as the threshold value. When it is determined that the elapsed time T does not exceed the threshold value (set time ts) (NO), the processing returns to step S60, and the processing of step S60 is repeated until the elapsed time T exceeds the threshold value (set time ts). When it is determined that the elapsed time T exceeds the threshold value (set time ts) (YES), on the other hand, the processing proceeds to step S80.

When a determination of YES is made in step S50, on the other hand, the valve control section 114 determines whether or not the elapsed time T measured by the valve control section 114 exceeds the threshold value (step S70 illustrated in FIG. 4). In this case, a value obtained by subtracting Δt from the set time ts is used as the threshold value. This is because the wheeled work vehicle 1 may slide down in an opposite direction from the traveling direction due to gravity when the state of disappearance of the traveling power continues while the wheeled work vehicle 1 is traveling uphill. Accordingly, during the uphill traveling, the state of disappearance of the traveling power is ended earlier than in other cases. When it is determined that the elapsed time T does not exceed the threshold value (set time ts−Δt) (NO), the processing returns to step S70, and the processing of step S70 is repeated until the elapsed time T exceeds the threshold value (set time ts−Δt). When it is determined that the elapsed time T exceeds the threshold value (set time ts−Δt) (YES), on the other hand, the processing proceeds to step S80.

When a determination of YES is made in step S60 or step S70, the valve control section 114 outputs, to the selector valve 63, the traveling valve control signal that switches the selector valve 63 switched to the neutral position n to the original position (the forward traveling position f or the backward traveling position r) on the basis of the traveling direction instruction signal of the forward/rearward traveling switching instruction device 25 (step S80 illustrated in FIG. 4). Consequently, the temporary interruption of the supply of the operating pilot pressure to the traveling control valve 53 is cleared, and the traveling control valve 53 is shifted from the neutral position N to the forward traveling position F side or the backward traveling position R side. As a result, the traveling power is restored.

Thus, the controller 100 first switches the selector valve 63 from the forward traveling position f or the backward traveling position r to the neutral position n when there is an instruction for a downshift of the transmission 15, and thereafter switches the shift changeover valve 79 to the low speed stage position L. Further, after the elapsed time T from the switching of the shift changeover valve 79 exceeds the threshold value, that is, after completion of the downshift of the transmission 15, the selector valve 63 is switched to the original position before the switching, and the series of processing at the time of the downshift of the transmission 15 is ended.

Next, operation of the wheeled work vehicle according to the first embodiment of the present invention will be described with reference to FIG. 2 and FIG. 4. Description will first be made of a case where the wheeled work vehicle is traveling in the forward traveling direction in a state in which the speed stage of the transmission is set to be the high speed stage.

In this case, the switching operation lever 25*a* of the forward/rearward traveling switching instruction device 25 illustrated in FIG. 2 is at the forward traveling position F, and the shift operation lever 26*a* of the shift instruction device 26 is at the high speed stage position H. The controller 100 determines that there is no instruction for a downshift of the transmission 15 (NO in step S10 illustrated in FIG. 4) on the basis of the high speed stage instruction signal from the shift instruction device 26, and ends the processing procedure at a time of a downshift.

In this case, the controller 100 maintains the output of the traveling valve control signal that controls the selector valve 63 to the forward traveling position f on the basis of the forward traveling instruction signal of the forward/rearward traveling switching instruction device 25. Specifically, the controller 100 maintains the output of the driving power to the first solenoid 63*a* of the selector valve 63. Thus, the selector valve 63 is maintained in the forward traveling position f, and the pilot secondary pressure (operating pilot pressure) generated according to the operation amount of the traveling pedal 62*a* acts on the first pilot pressure receiving portion 53*f* of the traveling control valve 53 via the selector valve 63. The position of the traveling control valve 53 is controlled to the forward traveling position F side according to the magnitude of the operating pilot pressure.

The hydraulic fluid delivered from the hydraulic pump 51 is supplied to the traveling hydraulic motor 52 via the traveling control valve 53 and the counter balance valve 57. The flow rate of the hydraulic fluid supplied to the traveling hydraulic motor 52 is controlled according to the position of the traveling control valve 53, and thus the rotational speed of the traveling hydraulic motor 52 is controlled. That is, the rotational speed of the traveling hydraulic motor 52 is controlled according to the operation amount of the traveling pedal 62*a*. In addition, the counter balance valve 57 is moved to the forward traveling position F side (right side in FIG. 2) by the driving pressure of the traveling hydraulic motor 52 which driving pressure occurs in the first main line 55.

The rotational power of the traveling hydraulic motor 52 is transmitted to the front wheel 12 and the rear wheel 13 via the propeller shafts 16 and the axles 17 with a change in speed by the transmission 15. Consequently, the front wheel 12 and the rear wheel 13 are driven, and the wheeled work vehicle 1 travels.

At this time, the controller 100 maintains the output of the shift valve control signal that controls the shift changeover valve 79 to the high speed stage position H on the basis of the high speed stage instruction signal of the shift instruction device 26. Specifically, the controller 100 maintains the stopping of the output of the driving power to the solenoid 79*a* of the shift changeover valve 79. Thus, the shift changeover valve 79 is maintained at the high speed stage position H, and thus the supply of the pilot hydraulic fluid to the high speed side clutch mechanism 75 is maintained and the interruption of the supply of the pilot hydraulic fluid to the low speed side clutch mechanism 77 is maintained. Therefore, connection between the reduction gear 73 and the high speed side gear train 74 by the high speed side clutch mechanism 75 is maintained, while disconnection between the reduction gear 73 and the low speed side gear train 76 is maintained.

The rotation of the traveling hydraulic motor 52 is input to the transmission 15, is changed in speed by the high speed side gear train 74 connected to the reduction gear 73, is output to the propeller shafts 16 via the output shaft 78 of the transmission 15, and is thereafter ultimately transmitted to the front wheel 12 and the rear wheel 13. The rotational speed of the front wheel 12 and the rear wheel 13 is thus adjusted according to the rotational speed of the traveling hydraulic motor 52 and the speed stage of the transmission 15. That is, the traveling speed of the wheeled work vehicle 1 is adjusted according to the operation amount of the traveling pedal 62*a* and the speed stage of the transmission 15.

During this traveling, the controller 100 can adjust the motor displacement of the traveling hydraulic motor 52 on the basis of the detected values of various kinds of sensors or the like. For example, the motor displacement is adjusted according to the magnitude of the driving pressure of the traveling hydraulic motor 52. In addition, the controller 100 can adjust the pump displacement of the hydraulic pump 51 on the basis of the operation amount of the work implement operation device, the detected values of the various kinds of sensors, and the motor displacement of the traveling hydraulic motor 52. For example, the motor displacement of the hydraulic pump 51 is adjusted in such a manner as to be interlocked with operation of the front work implement 4 (see FIG. 1) and an increase or a decrease in the motor displacement of the traveling hydraulic motor 52.

Next, description will be made of a case where the wheeled work vehicle traveling as described above downshifts the transmission. Before operation of the downshift, as described earlier, the selector valve 63 is in the forward traveling position f on the basis of the forward traveling instruction signal from the forward/rearward traveling switching instruction device 25 illustrated in FIG. 2, and the shift changeover valve 79 is in the high speed stage position H on the basis of the high speed stage instruction signal of the shift instruction device 26.

In this state, the shift operation lever 26a of the shift instruction device 26 is operated so as to be switched from the high speed stage position H to the low speed stage position L. Thus, the controller 100 detects switching of the shift instruction signal of the shift instruction device 26 from the high speed stage instruction signal to the low speed stage instruction signal, and determines that there is an instruction for a downshift of the transmission 15 (YES) (step S10 illustrated in FIG. 4).

Next, the controller 100 outputs, to the selector valve 63, the traveling valve control signal that switches the selector valve 63 in the forward traveling position f to the neutral position n irrespective of the forward traveling instruction signal from the forward/rearward traveling switching instruction device 25 (step S20 illustrated in FIG. 4). Specifically, the controller 100 stops the output of the driving power to the first and second solenoids 63a and 63b. Consequently, the selector valve 63 is selectively switched from the forward traveling position f to the neutral position n, and the supply of the pilot secondary pressure generated by the traveling pilot valve 62 to the first pilot pressure receiving portion 53f and the second pilot pressure receiving portion 53g of the traveling control valve 53 is interrupted. As a result, the traveling control valve 53 is switched to the neutral position N, the supply of the hydraulic fluid from the hydraulic pump 51 to the traveling hydraulic motor 52 is interrupted, and the driving force of the traveling hydraulic motor 52 disappears.

In this case, the rotation of the traveling hydraulic motor 52 is maintained due to inertial traveling of the wheeled work vehicle 1, and therefore the traveling hydraulic motor 52 functions as a pump. That is, the traveling hydraulic motor 52 rotated by the inertial traveling of the wheeled work vehicle 1 sucks in the hydraulic working fluid from the first main line 55, and delivers the hydraulic working fluid to the second main line 56. Therefore, a pressure in the first main line 55 is lowered, while a pressure in the second main line 56 is raised. The raised pressure in the second main line 56 becomes a brake pressure that brakes the rotation of the traveling hydraulic motor 52, so that the traveling speed of the wheeled work vehicle 1 is decreased.

In addition, since the pressure in the second main line 56 is raised while the pressure in the first main line 55 is lowered, the counter balance valve 57 is moved from the forward traveling position F side to the neutral position N side. Consequently, the hydraulic working fluid (return oil from the traveling hydraulic motor 52) flowing on the second main line 56 side of the counter balance valve 57 passes through the restrictor 57a in the neutral position N. Thus, a brake pressure occurs in the second main line 56, and the traveling speed of the wheeled work vehicle 1 is decreased.

In addition, the restrictor 53j is disposed on a communication passage that makes the first main line 55 and the second main line 56 communicate with each other in the neutral position N of the traveling control valve 53. Therefore, the return oil from the traveling hydraulic motor 52 passes through the restrictor 53j when flowing through the traveling control valve 53 switched to the neutral position N. Thus, a brake pressure occurs in the second main line 56, and the traveling speed of the wheeled work vehicle 1 is further decreased.

The traveling hydraulic motor 52 thus performs a pump action when the supply of the hydraulic fluid from the hydraulic pump 51 to the traveling hydraulic motor 52 is interrupted by the switching of the traveling control valve 53 to the neutral position N. Consequently, the pressure in the first main line 55 is lowered, while the pressure in the second main line 56 is raised. Thus, a brake pressure that brakes the rotation of the traveling hydraulic motor 52 occurs, and the traveling speed of the wheeled work vehicle 1 is decreased.

Next, the controller 100 outputs, to the shift changeover valve 79, the shift valve control signal that switches the shift changeover valve 79 to the low speed stage position L (step S30 illustrated in FIG. 4). Specifically, the controller 100 outputs driving power to the solenoid 79a of the shift changeover valve 79. Consequently, the shift changeover valve 79 is switched from the high speed stage position H to the low speed stage position L, and thus the supply of the pilot pressure to the high speed side clutch mechanism 75 is interrupted, and the pilot pressure is supplied to the low speed side clutch mechanism 77. Therefore, the high speed side clutch mechanism 75 in a connected state is disconnected, and the low speed side clutch mechanism 77 in a disconnected state is connected. However, it takes a predetermined time for the high speed side clutch mechanism 75 to make a transition from the connected state to a complete disconnected state due to the interruption of the pilot pressure and for the low speed side clutch mechanism 77 to make a transition from the disconnected state to a complete connected state due to the supply of the pilot pressure.

In the present embodiment, the low speed side clutch mechanism 77 is connected after the rotational speed of the traveling hydraulic motor 52 is temporarily decreased. Thus, a speed deviation between the reduction gear 73 and the low speed side clutch mechanism 77 of the transmission 15 is correspondingly decreased, and thus a shift shock at the downshift can be alleviated. In this case, the motor displacement of the traveling hydraulic motor 52 and the pump displacement of the hydraulic pump 51 do not need to be changed to decrease the rotational speed of the traveling hydraulic motor 52. Hence, the operation of the front work implement 4 is not affected.

Next, the controller 100 starts to measure the elapsed time T from the output of the shift valve control signal that switches the shift changeover valve 79 to the low speed stage position L (step S40 illustrated in FIG. 4).

Next, the controller 100 determines whether or not the wheeled work vehicle 1 is traveling uphill on the basis of the detected value θ from the inclination angle sensor 30 (step S50 illustrated in FIG. 4). When the detected value θ from the inclination angle sensor 30 is equal to or smaller than the set inclination angle θs, the controller 100 determines that the work vehicle is not traveling uphill (NO), and determines whether or not the elapsed time T exceeds the threshold value (set time ts) (step S60 illustrated in FIG. 4). When the detected value θ from the inclination angle sensor 30 is larger than the set inclination angle θs, on the other hand, the controller 100 determines that the work vehicle is traveling uphill (YES), and determines whether or not the elapsed time T exceeds the threshold value (set time ts−Δt) (step S70 illustrated in FIG. 4).

When the controller 100 determines that the elapsed time T exceeds ts (in the case of step S60 illustrated in FIG. 4) or ts−Δt (in the case of step S70 illustrated in FIG. 4) as the threshold value (YES), the controller 100 outputs, to the selector valve 63, the traveling valve control signal that switches the selector valve 63 switched from the forward traveling position f to the neutral position n to the original forward traveling position f (step S80 illustrated in FIG. 4). Specifically, the controller 100 outputs driving power to the first solenoid 63a on the basis of the forward traveling instruction signal of the forward/rearward traveling switching instruction device 25. Consequently, the selector valve 63 is switched from the neutral position n to the forward traveling position f (original position), and the interruption of the supply of the operating pilot pressure to the traveling control valve 53 is cleared.

Therefore, the operating pilot pressure generated according to the operation amount of the traveling pedal 62a acts on the first pilot pressure receiving portion 53f of the traveling control valve 53 via the selector valve 63, and the position of the traveling control valve 53 is controlled to the forward traveling position F side according to the magnitude of the operating pilot pressure. Consequently, the hydraulic fluid delivered from the hydraulic pump 51 is supplied to the traveling hydraulic motor 52 via the traveling control valve 53 and the counter balance valve 57 again, and the driving force of the traveling hydraulic motor 52 is restored. The flow rate of the hydraulic fluid supplied to the traveling hydraulic motor 52 is controlled according to the position of the traveling control valve 53, and thus the rotational speed of the traveling hydraulic motor 52 is controlled. In addition, the driving pressure of the traveling hydraulic motor 52 which driving pressure occurs in the first main line 55 moves the counter balance valve 57 from the neutral position N to the forward traveling position F side. That is, the hydraulic circuit returns to the original state corresponding to the operation of the forward/rearward traveling switching instruction device 25 and the traveling pedal 62a.

In this case, the rotation of the traveling hydraulic motor 52 is changed in speed by the low speed side gear train 76 connected to the reduction gear 73 by the low speed side clutch mechanism 77 of the transmission 15, and is then ultimately transmitted to the front wheel 12 and the rear wheel 13. Hence, the wheeled work vehicle 1 makes a transition to a traveling state in which the speed stage of the transmission 15 is the low speed stage.

In the present embodiment, the selector valve 63 is switched to the original position after the passage of the set time is determined in advance from the switching of the shift changeover valve 79 to the low speed stage position L. It takes a certain time for the low speed side clutch mechanism 77 to make a transition from a disconnected state to a complete connected state. However, the set time ts is set so as to be longer than the certain time. Hence, the driving force of the traveling hydraulic motor 52 can be restored after the shifting of the transmission 15 from the high speed stage to the low speed stage is surely completed, and thus a shock at the downshift of the transmission 15 can be alleviated.

In addition, in the present embodiment, a shock at the downshift of the transmission 15 is alleviated by switching the traveling control valve 53 to the neutral position N, and thereby making the driving force (traveling power) of the traveling hydraulic motor 52 temporarily disappear. However, when the state of disappearance of the driving force of the traveling hydraulic motor 52 is maintained for too long and when the wheeled work vehicle 1 is traveling uphill, the work vehicle may slip down in an opposite direction from the traveling direction due to the own gravity of the work vehicle. Accordingly, during the uphill traveling of the wheeled work vehicle 1, the threshold value as a comparison target for the elapsed time T is changed so as to be shortened from ts to ts−Δt, and thereby a time of temporary disappearance of the driving force of the traveling hydraulic motor 52 is shortened as compared with a case where the wheeled work vehicle 1 is not traveling uphill. It is thereby possible to prevent the work vehicle traveling uphill from sliding down at the downshift of the transmission 15.

According to the wheeled work vehicle in accordance with the first embodiment of the present invention described above, the wheeled work vehicle 1 includes: the prime mover 28; the hydraulic pump 51 driven by the prime mover 28; the traveling hydraulic motor 52 driven by the hydraulic fluid supplied from the hydraulic pump 51; the wheels 12 and 13 driven by the rotational power of the traveling hydraulic motor 52; the transmission 15 that is interposed between the traveling hydraulic motor 52 and the wheels 12 and 13, transmits the rotational power of the traveling hydraulic motor 52 to the wheels 12 and 13, and has at least two speed stages, the two speed stages being the low speed stage (first speed stage) and the high speed stage; the traveling control valve 53 that controls the direction and flow rate of the hydraulic fluid to be supplied from the hydraulic pump 51 to the traveling hydraulic motor 52 and has the neutral position (first interruption position) N that interrupts supply of the hydraulic fluid from the hydraulic pump 51 to the traveling hydraulic motor 52; the shift changeover valve 79 that shifts the speed stage of the transmission 15 through supply and discharge of the hydraulic fluid to and from the transmission 15 by a position of the shift changeover valve 79 being selectively switched; and the controller 100 that controls the traveling control valve 53 and the shift changeover valve 79. The controller 100 is configured to switch the traveling control valve 53 to the neutral position (first interruption position) N, then switch the position of the shift changeover valve 79 such that the speed stage of the transmission 15 is shifted from the high speed stage to the low speed stage, and switch the traveling control valve 53 from the neutral position (first interruption position) N to the original position side before the switching in the case where the controller 100 shifts the speed stage of the transmission 15 from the high speed stage to the low speed stage. Thus, the speed stage of the transmission 15 can be shifted from the high speed stage to the low speed stage after the rotational speed of the traveling hydraulic motor 52 is decreased by interruption of the supply of the hydraulic fluid from the hydraulic pump 51 to the traveling hydraulic motor 52. In this case, the pump displacement of the hydraulic pump 51 and the motor displacement of the traveling hydraulic motor 52 do not need to be changed at the shifting of the transmission 15 to the low speed stage. Hence, even when the wheeled work vehicle 1 has the work implement 4, a shock at the shifting of the transmission 15 from the high speed stage to the low speed stage can be alleviated without operability of the work implement 4 being affected.

In addition, in the present embodiment, the traveling control valve 53 is a pilot valve driven by the supply of the operating pilot pressure, and switched to the neutral position (first interruption position) N by interruption of the supply of the operating pilot pressure, the selector valve 63 controls the driving of the traveling control valve 53 by the supply of the operating pilot pressure to the traveling control valve 53, and has the neutral position (second interruption position) n that interrupts the supply of the operating pilot pressure to the traveling control valve 53. Further, the controller 100 switches the selector valve 63 to the neutral position (second interruption position) n to indirectly control the traveling control valve 53 such that the traveling control valve 53 is switched to the neutral position (first interruption position) N, and switches the selector valve 63 from the neutral position (second interruption position) n to the original position side before the switching to indirectly control the traveling control valve 53 such that the traveling control valve 53 is switched from the neutral position (first interruption position) N to the original position side before the switching. Hence, the intervention of the selector valve 63 facilitates switching control of the traveling control valve 53 to the neutral position (first interruption position) N by the controller 100.

In addition, in the present embodiment, the controller 100 measures the elapsed time T from a start of control for switching the position of the shift changeover valve 79, and starts control for switching the traveling control valve 53 from the neutral position (first interruption position) N to the original position side before the switching after the measured elapsed time T exceeds a threshold value. Thus, the driving force (traveling power) of the traveling hydraulic motor 52 can be restored after the shifting of the transmission 15 from the high speed stage to the low speed stage is surely completed. It is therefore possible to surely alleviate a shock at the shifting of the transmission 15 from the high speed stage to the low speed stage.

In addition, in the present embodiment, the inclination angle sensor 30 is included which detects an inclination angle of the vehicle with respect to a horizontal plane in a traveling direction. Further, the controller 100 lowers the threshold value when the detected value θ of the inclination angle sensor 30 is larger than the set inclination angle θs determined in advance, compared to the case where the detected value θ of the inclination angle sensor 30 is equal to or smaller than the set inclination angle θs. Consequently, timing of restoration of the driving force (traveling power) of the traveling hydraulic motor 52 is made earlier during uphill traveling. Hence, the wheeled work vehicle 1 traveling uphill can be prevented from sliding down.

[Modification of First Embodiment]

Figure 5:
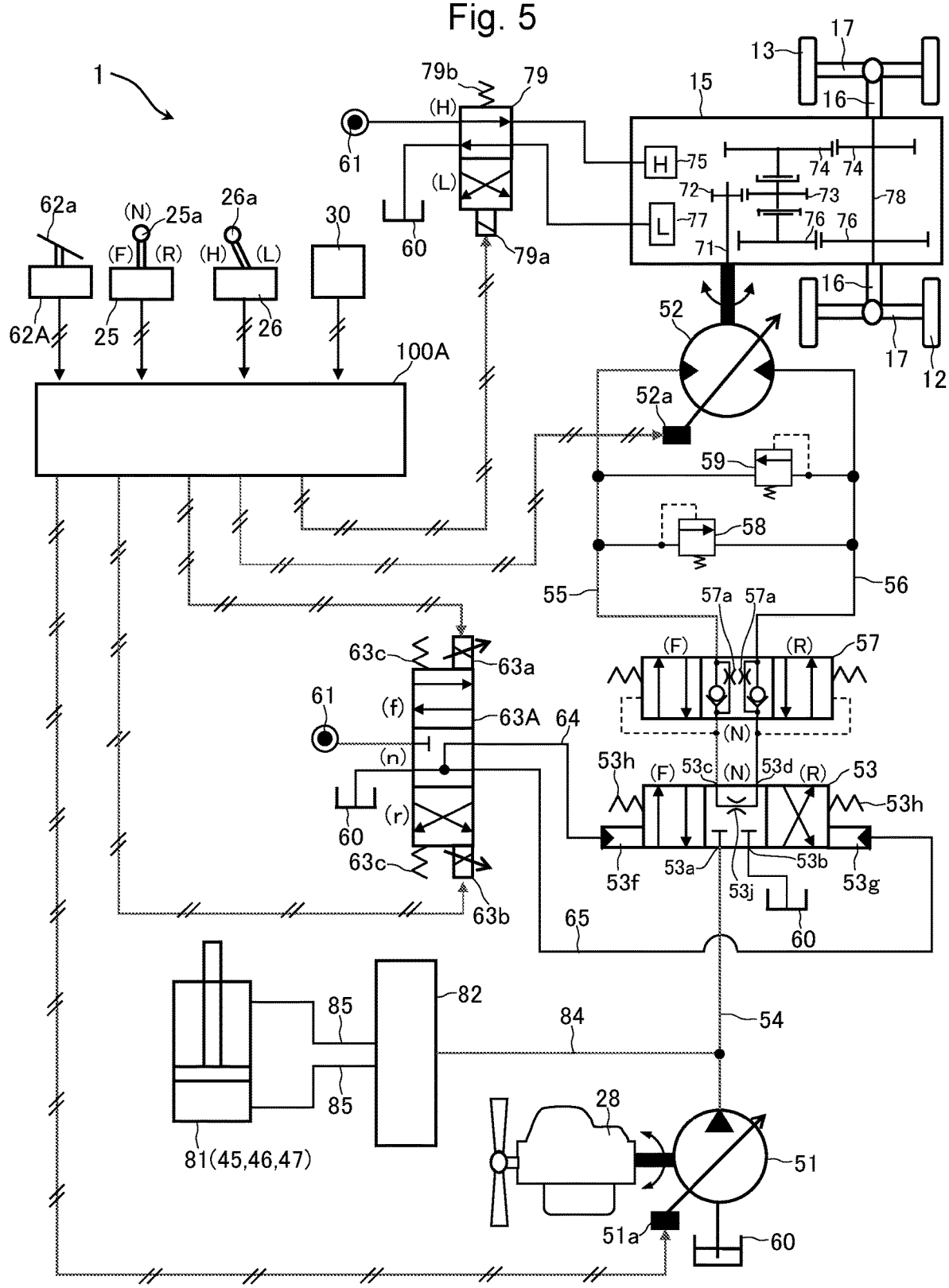
FIG. 5 is a diagram illustrating a hydraulic circuit and a traveling power transmitting mechanism in a wheeled work vehicle according to a modification of the first embodiment of the present invention.
Figure 6:
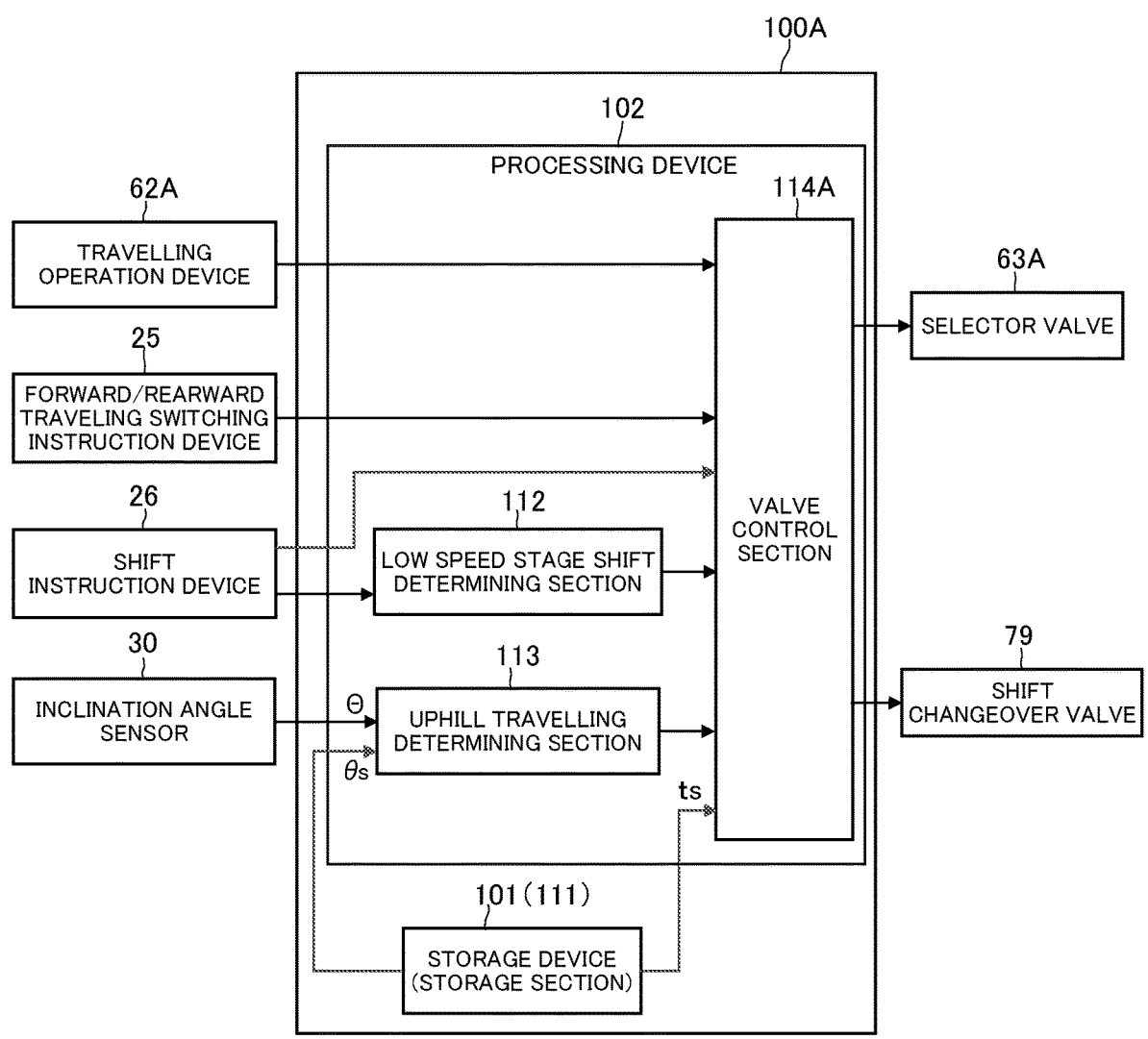
FIG. 6 is a functional block diagram of a controller that constitutes a part of the wheeled work vehicle according to the modification of the first embodiment of the present invention illustrated in FIG. 5.

A wheeled work vehicle according to a modification of the first embodiment of the present invention will next be described with reference to FIG. 5 and FIG. 6. FIG. 5 is a diagram illustrating a hydraulic circuit and a traveling power transmitting mechanism in the wheeled work vehicle according to the modification of the first embodiment of the present invention. FIG. 6 is a functional block diagram of a controller that constitutes a part of the wheeled work vehicle according to the modification of the first embodiment of the present invention, the modification being illustrated in FIG. 5. Incidentally, in FIG. 5 and FIG. 6, parts having the same reference numerals as the reference numerals illustrated in FIGS. 1 to 4 are similar parts, and therefore detailed description thereof will be omitted.

The wheeled work vehicle according to the modification of the first embodiment of the present invention illustrated in FIG. 5 is different from the first embodiment in the following three main points. First, the wheeled work vehicle includes a traveling operation device 62A which outputs, to a controller 100A, a traveling instruction signal that gives an instruction for traveling according to the operation amount of the traveling pedal 62a in place of the traveling pilot valve 62 that generates the pilot secondary pressure (operating pilot pressure) according to the operation amount of the traveling pedal 62a in the first embodiment (see FIG. 2). Second, a selector valve 63A is a solenoid proportional valve, and the position (stroke amount) of the selector valve 63A is controlled continuously according to the magnitude of driving power input from the controller 100A to the first solenoid 63a and the second solenoid 63b. The selector valve 63A has a function of controlling the magnitude and direction of the operating pilot pressure supplied from the pilot hydraulic fluid source 61 to the traveling control valve 53. Third, the controller 100A is electrically connected to the traveling operation device 62A, and controls a position (stroke amount) of the selector valve 63A continuously on the basis of the traveling instruction signal from the traveling operation device 62A.

As illustrated in FIG. 6, a valve control section 114A of the controller 100A outputs, to the selector valve 63A, the traveling valve control signal that controls the position of the selector valve 63A on the basis of the traveling instruction signal from the traveling operation device 62A and the traveling direction instruction signal from the forward/rearward traveling switching instruction device 25 when the low speed stage shift determining section 112 determines that there is no instruction for a downshift of the transmission 15. Specifically, the controller 100A supplies the driving power corresponding to the operation amount of the traveling pedal 62a illustrated in FIG. 5 to the first solenoid 63a or the second solenoid 63b of the selector valve 63A which solenoid corresponds to the traveling direction instruction signal of the forward/rearward traveling switching instruction device 25. Consequently, controlled is the magnitude of the operating pilot pressure made to act on the first pilot pressure receiving portion 53f or the second pilot pressure receiving portion 53g of the traveling control valve 53 which pilot pressure receiving portion corresponds to the operation position of the forward/rearward traveling switching instruction device 25. When the low speed stage shift determining section 112 determines that there is an instruction for a downshift, on the other hand, the valve control section 114A outputs, to the selector valve 63A, the traveling valve control signal that switches the selector valve 63A to the neutral position n irrespective of the traveling instruction signal from the traveling operation device 62A and the traveling direction instruction signal from the forward/rearward traveling switching instruction device 25. Specifically, the supply of the driving power to the first and second solenoids 63a and 63b of the selector valve 63A is stopped.

In the present modification, at downshifting the transmission 15, the controller 100A can perform a processing procedure similar to that of the first embodiment (flowchart illustrated in FIG. 4).

In addition, in the present modification, when the controller 100A switches the selector valve 63A from the neutral position n to the original position side in step S80 of the flowchart illustrated in FIG. 4, the controller 100A can gradually increase the driving power supplied to the first solenoid 63a or the second solenoid 63b of the selector valve 63A. Consequently, the switching of the selector valve 63A from the neutral position n to the original position is performed gradually, and the switching speed of the selector valve 63A is decreased as compared with the case of the first embodiment. Accordingly, the switching of the traveling control valve 53 from the neutral position N is also performed gradually. Thus, the flow rate of the hydraulic fluid supplied from the hydraulic pump 51 to the traveling hydraulic motor 52 is gradually increased, and thus the rotational speed of the traveling hydraulic motor 52 is raised smoothly.

The wheeled work vehicle according to the modification of the first embodiment of the present invention described above can provide effects similar to those of the foregoing first embodiment.

In addition, in the present modification, the selector valve 63A is a solenoid proportional valve whose position is controlled according to the magnitude of the driving power input from the controller 100A. Further, the controller 100A gradually increases the driving power input to the selector valve 63A to switch the selector valve 63A from the neutral position (second interruption position) n to the original position side before switching. Consequently, the flow rate of the hydraulic fluid supplied from the hydraulic pump 51 to the traveling hydraulic motor 52 is gradually increased, and thus the rotational speed of the traveling hydraulic motor 52 can be raised smoothly. It is therefore possible to prevent discomfort of machine body behavior at a time of restoration of the driving force (traveling power) of the traveling hydraulic motor 52.

Other Embodiments

It is to be noted that the present invention is not limited to the foregoing embodiments, and includes various modifications. The foregoing embodiments are described in detail to describe the present invention in an easily understandable manner, and are not necessarily limited to embodiments including all of the described configurations. For example, a part of a configuration of a certain embodiment can be replaced with a configuration of another embodiment, and a configuration of another embodiment can be added to a configuration of a certain embodiment. In addition, for a part of a configuration of each embodiment, addition of another configuration, deletion, or substitution is possible.

For example, while the wheeled hydraulic excavator 1 has been described as an example of the wheeled work vehicle to which the present invention is applied in the foregoing first embodiment and the modification of the first embodiment, the present invention is widely applicable to wheeled work vehicles including a transmission interposed between a traveling hydraulic motor and wheels.

In addition, in the foregoing embodiment, description has been made of processing at a downshift in the case of the transmission 15 that can be shifted between the two stages of the high speed stage and the low speed stage. However, processing at a downshift of the transmission can be similarly applied to cases of transmissions that can be shifted between three stages or more.

In addition, the foregoing embodiment illustrates an example in which the controller 100 or 100A is configured to shift the speed stage of the transmission 15 to the high speed stage or the low speed stage on the basis of the shift instruction signal from the shift instruction device 26. However, the controller can also be configured to shift the speed stage of the transmission 15 to the high speed stage or the low speed stage automatically when a predetermined condition is satisfied. For example, a configuration is possible in which the transmission 15 is automatically downshifted when the traveling speed of the wheeled work vehicle is equal to or lower than a predetermined speed. In addition, a configuration is possible in which the transmission 15 is automatically downshifted when the driving pressure of the traveling hydraulic motor 52 (pressure in the first main line 55 or the second main line 56) is equal to or higher than a predetermined pressure and the rotational speed of the traveling hydraulic motor 52 is equal to or lower than a predetermined speed.

In addition, the foregoing embodiment illustrates an example of a configuration in which the connection and disconnection of the high speed side clutch mechanism 75 and the connection and disconnection of the low speed side clutch mechanism 77 are performed by one shift changeover valve 79. However, a configuration is also possible in which one changeover valve is used for the high speed side clutch mechanism 75, and another separate changeover valve is used for the low speed side clutch mechanism 77. Also in this case, the speed stage of the transmission is shifted through supply and discharge of the hydraulic fluid to and from the high speed side clutch mechanism 75 and the low speed side clutch mechanism 77 of the transmission 15 by selectively switching each changeover valve to two positions.

In addition, the foregoing embodiment illustrates an example of a configuration in which the forward/rearward traveling switching instruction device 25 and the shift instruction device 26 output instruction signals by a lever system. However, the forward/rearward traveling switching instruction device and the shift instruction device can also be configured to output instruction signals by a switch system.

In addition, the foregoing embodiment illustrates an example of a configuration in which the traveling control valve 53 of a hydraulic pilot type which control valve is driven by the supply of the operating pilot pressure via the selector valve 63 is used as a control valve that controls the direction and flow rate of the hydraulic fluid supplied from the hydraulic pump 51 to the traveling hydraulic motor 52. However, the traveling control valve can also be a solenoid proportional valve directly driven by a control signal from the controller 100 or 100A.

In addition, the foregoing embodiment illustrates an example in which when the detected value θ from the inclination angle sensor 30 is equal to or smaller than the set inclination angle θs stored in the storage section 111 in advance, the uphill traveling determining section 113 of the controller 100 or 100A determines that the wheeled work vehicle is not traveling uphill (NO), and the processing proceeds to step S60, whereas when the detected value θ from the inclination angle sensor 30 is larger than the set inclination angle θs, the uphill traveling determining section 113 of the controller 100 or 100A determines that the wheeled work vehicle is traveling uphill (YES), and the processing proceeds to step S70 (see steps S50 to S70 illustrated in FIG. 4). However, the controller can also be configured to proceed to step S70, and use ts−Δt as the threshold value to be compared with the elapsed time T even at a time of traveling on a gentler ascending slope than the set inclination angle θs when an oil temperature in the hydraulic working fluid tank 60 is a low temperature at a level at which torque transmission is delayed. That is, the uphill traveling determining section of the controller can be configured to change the threshold value to be compared with the detected value θ from the inclination angle sensor 30 from the set inclination angle θs to a smaller value θs−Δθ when the oil temperature within the hydraulic working fluid tank 60 is lower than a set temperature determined in advance in step S50 illustrated in FIG. 4. In this case, the wheeled hydraulic excavator includes a temperature sensor 31 as indicated by chain double-dashed lines in FIG. 2 and FIG. 3, for example. The temperature sensor 31 detects the oil temperature of the hydraulic working fluid retained in the hydraulic working fluid tank 60, and outputs the detected oil temperature to the uphill traveling determining section 113 of the controller 100.

DESCRIPTION OF REFERENCE CHARACTERS

1: Wheeled hydraulic excavator (wheeled work vehicle)
12: Front wheel (wheel)
13: Rear wheel (wheel)
15: Transmission
28: Prime mover
30: Inclination angle sensor
51: Hydraulic pump
52: Traveling hydraulic motor
53: Traveling control valve
63, 63A: Selector valve
79: Shift changeover valve
100, 100A: Controller

The invention claimed is:

1. A wheeled work vehicle comprising:
a prime mover;
a hydraulic pump driven by the prime mover;
a traveling hydraulic motor driven by hydraulic fluid supplied from the hydraulic pump;
a wheel driven by rotational power of the traveling hydraulic motor;
a transmission that is interposed between the traveling hydraulic motor and the wheel and transmits the rotational power of the traveling hydraulic motor to the wheel with a change in speed, the transmission having at least two speed stages, the two speed stages being a first speed stage and a second speed stage as a higher speed stage than the first speed stage;
a traveling control valve that controls a direction and a flow rate of the hydraulic fluid to be supplied from the hydraulic pump to the traveling hydraulic motor, the traveling control valve having a first interruption position that interrupts supply of the hydraulic fluid from the hydraulic pump to the traveling hydraulic motor;
a changeover valve that shifts a speed stage of the transmission through supply and discharge of hydraulic fluid to and from the transmission by a position of the changeover valve being selectively switched; and
a controller that controls the traveling control valve and the changeover valve, wherein
the controller is configured to
switch the traveling control valve to the first interruption position,
then switch the position of the changeover valve such that the speed stage of the transmission is shifted from the second speed stage to the first speed stage, and
switch the traveling control valve from the first interruption position to an original position side before the switching in a case where the controller shifts the speed stage of the transmission from the second speed stage to the first speed stage.

2. The wheeled work vehicle according to claim 1, wherein
the traveling control valve is a pilot valve driven by supply of an operating pilot pressure, and switched to the first interruption position by interruption of the supply of the operating pilot pressure,
the wheeled work vehicle further includes a selector valve that controls driving of the traveling control valve by the supply of the operating pilot pressure to the traveling control valve, the selector valve having a second interruption position that interrupts the supply of the operating pilot pressure to the traveling control valve, and,
the controller is configured to
switch the selector valve to the second interruption position to indirectly control the traveling control valve such that the traveling control valve is switched to the first interruption position, and
switch the selector valve from the second interruption position to an original position side before the switching to indirectly control the traveling control valve such that the traveling control valve is switched from the first interruption position to the original position side before the switching.

3. The wheeled work vehicle according to claim 2, wherein
the selector valve is a solenoid proportional valve whose position is controlled according to magnitude of driving power input from the controller, and
the controller is configured to gradually increase the driving power input to the selector valve to switch the selector valve from the second interruption position to the original position side before the switching.

4. The wheeled work vehicle according to claim 1, wherein
the controller is configured to
measure an elapsed time from a start of control for switching the position of the changeover valve, and
start control for switching the traveling control valve from the first interruption position to the original position side before the switching after a measured elapsed time exceeds a threshold value.

5. The wheeled work vehicle according to claim 4, further comprising:
an inclination angle sensor that detects an inclination angle of the vehicle with respect to a horizontal plane in a traveling direction, wherein
the controller is configured to lower the threshold value when a detected value of the inclination angle sensor is larger than a set inclination angle determined in advance, compared to a case where a detected value of the inclination angle sensor is equal to or smaller than the set inclination angle.

\* \* \* \* \*